Jan. 11, 1944.   F. A. PARSONS   2,339,102
TRANSMISSION AND CONTROL MECHANISM
Original Filed April 17, 1940   5 Sheets-Sheet 1

INVENTOR:
Fred A. Parsons

INVENTOR:
Fred A. Parsons

Jan. 11, 1944. F. A. PARSONS 2,339,102
TRANSMISSION AND CONTROL MECHANISM
Original Filed April 17, 1940 5 Sheets-Sheet 3

INVENTOR:
Fred A. Parsons

Jan. 11, 1944.  F. A. PARSONS  2,339,102
TRANSMISSION AND CONTROL MECHANISM
Original Filed April 17, 1940   5 Sheets-Sheet 5

INVENTOR:
Fred A. Parsons

Patented Jan. 11, 1944

2,339,102

UNITED STATES PATENT OFFICE 2,339,102

TRANSMISSION AND CONTROL MECHANISM

Fred A. Parsons, Milwaukee, Wis., assignor to Kearney & Trecker Corporation, West Allis, Wis., a corporation of Wisconsin Original application April 17, 1940, Serial No. 330,051. Divided and this application November 10, 1941, Serial No. 418,468

10 Claims. (Cl. 90—22)

This invention relates generally to transmission and control mechanism, and more particularly to apparatus for eliminating lost motion and attendant backlash or overrun in machine tool driving trains.

This application is a division of my copending application Serial No. 330,051, filed April 17, 1940.

A purpose of the present invention is to provide a transmission mechanism in combination with improved means responsive to variations in the torque being transmitted, and operative in a manner such that the torque variations may be utilized for control or elimination of backlash or overrun in certain portions of the transmission train, and especially to prevent overrun in the train such as may occur, for example, in a milling machine table drive where the cutting pressure urges the table ahead of its driving train.

A further purpose is to provide an improved torque responsive device in combination with a reversible table transmission, the torque responsive device being arranged for operation at least in part in accordance with the direction of movement of the table transmission.

A further purpose is to provide an improved torque responsive device in combination with a table transmission and a reversible spindle transmission, the torque responsive device being arranged for operation at least in part in accordance with the direction of rotation of the spindle transmission.

A further purpose is to provide an improved torque responsive device in combination with a reversible table transmission and a reversible spindle transmission, the torque responsive device being arranged for operation in part in accordance with the direction of table movement and in part in accordance with the direction of rotation of the spindle.

A further purpose is to provide an improved torque responsive device in combination with a reversible table transmission including means shiftable for alternative feed and quick traverse rates of table movement, the torque responsive device being arranged for operation in part in accordance with the direction of table movement and in part in accordance with the rate of table movement.

A further purpose is to provide an improved torque responsive device in combination with a reversible table transmission having two rates of movement in both directions and a reversible spindle transmission, the torque responsive device being arranged for operation in part in accordance with the direction and rate of table movement and in part in accordance with the direction of spindle rotation.

A further purpose is to provide an improved brake means in combination with a torque responsive device and a table transmission, the brake means being arranged in a manner to be regulated in accordance with the position of the torque responsive device.

A further purpose is generally to simplify and improve the construction and operation of machine tools, and particularly of milling machines, and especially for the purpose previously mentioned, and still other purposes will be apparent from the specification.

The invention consists of the construction and combination of parts as herein illustrated, described and claimed, and in such modifications of the structure illustrated and described as may be equivalent of the subjoined claims.

Throughout this specification the same reference characters have been used to indicate the same parts, and in the drawings.

Figure 1:
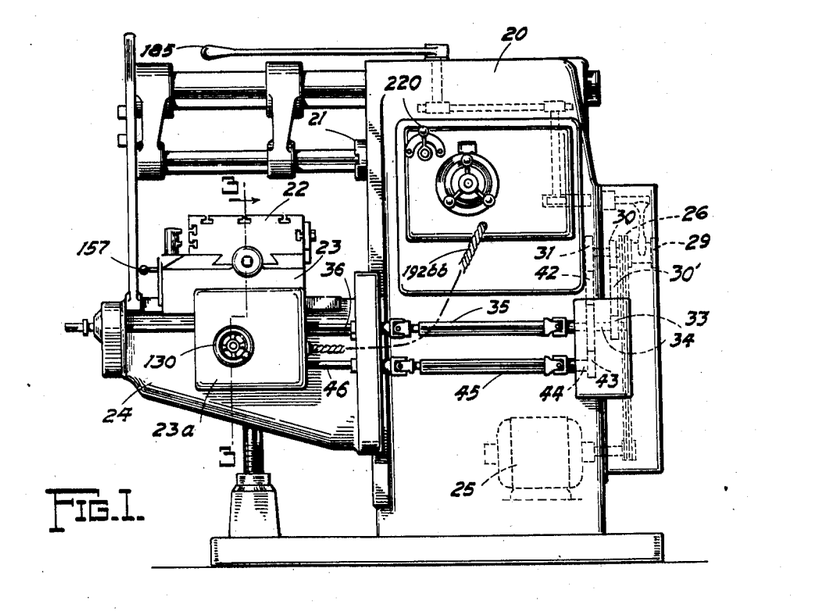
Figure 1 is a right side elevation of a milling machine in which the invention is incorporated in certain of its aspects.

The machine illustrated in Fig. 1 is a milling machine which includes a column 20, a tool spindle 21 rotatably supported on the column, and a work support or table 22 guided for movement on a saddle 23 in a direction transverse to the axis of the spindle, the saddle being supported for cross movement on a knee 24 which is vertically movable on the column. The knee, saddle and table together provide for table movement relative to spindle 21 in three mutually transverse paths.

The spindle 21, Fig. 1, is driven from a power source such as a motor 25, through a main clutch generally denoted by the numeral 26. The spindle transmission may be of any suitable type, but in the present machine includes rate change and reversing mechanism of the form disclosed in my copending application Serial No. 126,779, filed February 20, 1937, which matured into Patent No. 2,203,743, dated June 11, 1940, and will not, therefore, here be described in detail. Clutch 26 may be engaged by one direction of movement of a hand lever 185, Fig. 1. The other direction of movement of the clutch hub engages a brake, generally denoted by the numeral 29. A gear 30 is driven when the motor 25 is running, and forms the initial drive gear of a table quick traverse drive train later described. A gear 31 is driven only when clutch 26 is engaged, and forms the initial drive gear for a table feed rate train later described.

Figure 3:
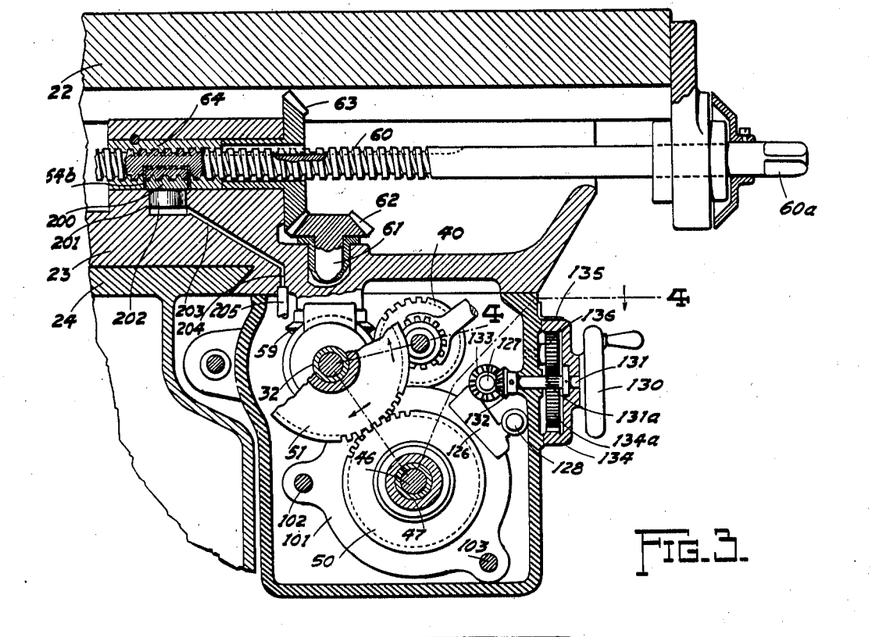
Figure 3 is a partial section taken approximately along the line 3—3 of Fig. 1 and enlarged.
Figure 4:
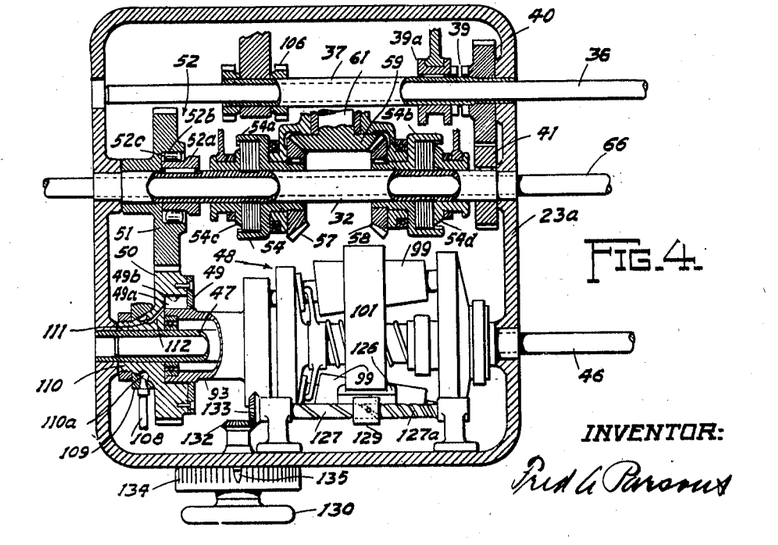
Figure 4 is a sectional development of transmission and other mechanism, taken approximately along line 4—4 of Fig. 3.

The feed and quick traverse trains just mentioned are alternatively connectible to drive a rotatable sleeve 32, Figs. 3, 4, carried in a box or housing 23a fixed on saddle 23. The quick traverse train includes the initial gear 30, an idler gear train 30', Fig. 1, a gear 33, a shaft 34, an extensible universal joint shaft device 35, a shaft 36, Figs. 1, 4, a sleeve 37 rotatably journaled in the housing 23a and slidably splined with shaft 36, a jaw clutch 39 which includes a shiftable member 39a, and gears 40, 41, which drive the sleeve 32 from clutch 39 but only when the clutch 39 is engaged.

The feed train includes the initial gear 31, an idler gear train 42, Fig. 1, a gear 43, a shaft 44, an extensible universal joint shaft device 45, a shaft 46, Figs. 1, 4, a sleeve 47, Figs. 3, 4, rotatably journaled in the housing 23a and slidably splined with shaft 46, a stepless feed rate changer generally denoted by the numeral 48, a torque measuring device generally denoted by the numeral 49, gears 50, 51 and an overrunning clutch device generally denoted by the numeral 52, adapted to drive the sleeve 32 at a feed rate that is variable according to the adjustment of rate changer 48, but which drives only when the clutch 39 of the quick traverse train is disengaged.

The overrunning clutch 52, Fig. 4, may be of any suitable type, but in this instance is of a well-known form which includes an inner member 52a fixed on the sleeve 32, an outer member 52b fixed on or integrally formed with the gear 51, and clutch rollers such as 52c, the inner member having cam surfaces whereby springs, not shown, may operate against the rollers to wedge the rollers for the outer member to drive the inner member except when the inner member is driven at a faster rate than the outer member and in the same direction, as occurs when the clutch 39 of the quick traverse train is engaged. By this arrangement the sleeve 32 is alternatively driven at quick traverse rate or at feed rate accordingly as the clutch 39 is engaged or disengaged, the direction of rotation being the same in either case.

The table 22 may be driven in either direction from the sleeve 32 through a table reverser generally denoted by the numeral 54, Fig. 4, which includes friction clutches 54a, 54b each comprising a set of clutch plates in which the alternate plates are keyed with sleeve 32 and with the extended and enlarged hubs of associated bevel gears 57, 58, whereby an intermediate bevel gear 59 may be driven in opposite directions accordingly as clutch spools 54c, 54d are unitarily axially shifted in the one or the other direction, the clutch spools having an intermediate position in which neither clutch is engaged. Bevel gear 59 is connected to drive a table screw 60, Fig. 3, through a shaft 61 and a bevel gear pair 62, 63, the screw 60 being slidably splined in the bore of gear 63 and engaging a nut 64 fixed in saddle 23. The screw 60 is squared at 60a for application of a crank, not shown, for manual adjustment of the table in either direction.

Figure 5:
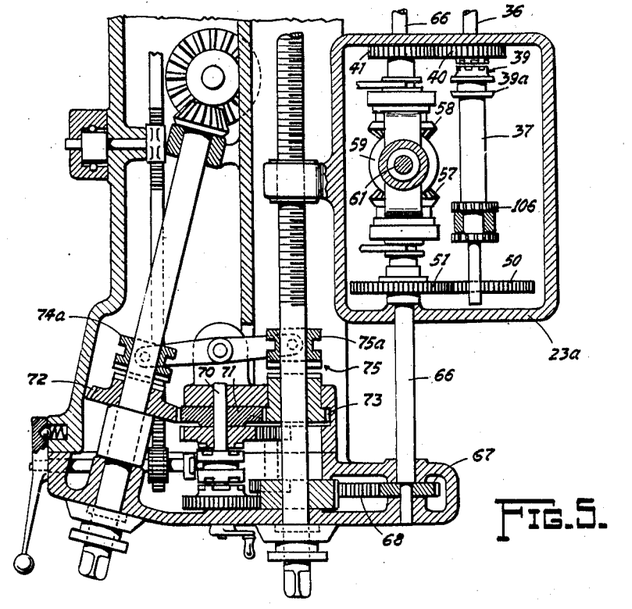
Figure 5 is a section of transmission and control mechanism taken approximately along line 5—5 of Fig. 2, and enlarged.

Either the saddle 23 or knee 24 may be driven in either direction from sleeve 32, Fig. 4, through a shaft 66, Figs. 4, 5, gears 67, 68, a suitable reverser, a shaft 70, a gear 71 fixed on shaft 70, and gears 72, 73 respectively associated with a suitable knee selector clutch and a saddle selector clutch 75, the selector clutches providing shiftable elements 74a, 75a, Fig. 5, sutably interlocked in such manner that engagement of the one clutch disengages the other. The saddle and knee transmission and control mechanism is more fully described in said copending application and need not here be further described.

Figure 2:
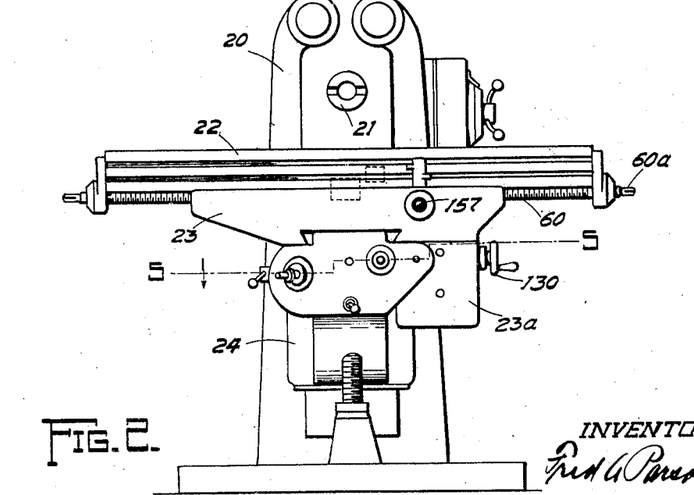
Figure 2 is a front elevation of the same machine.

The quick traverse selector clutch 39 is under the operative control of the vertical movements of a hand lever 157, Figs. 1, 2, which is mounted for universal pivotal movement, and the table reverser 54 is similarly under the control of the horizontal movements of the same hand lever. The control connections may be effected in a variety of ways, a preferred method being fully described in said copending application and, since the particular method does not concern this application, it need not here be further described.

Figure 6:
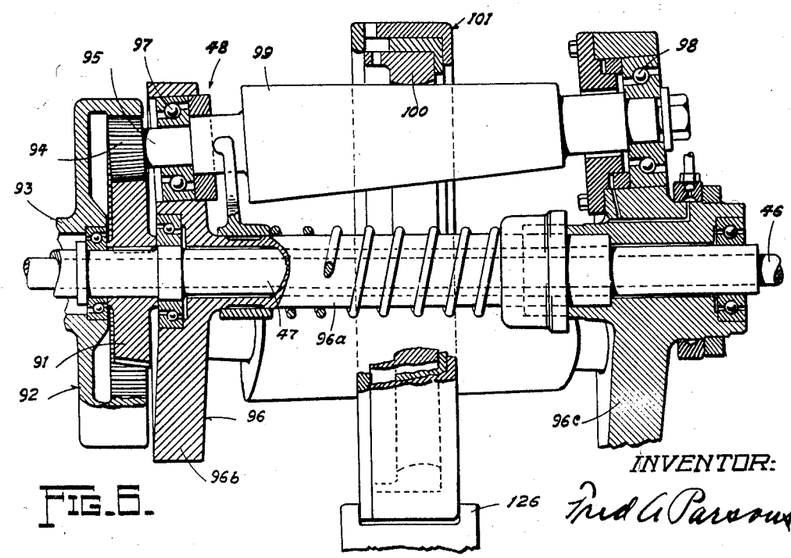
Figure 6 is an enlarged sectional view of a rate change device shown in Fig. 4.

The feed rate changer unit 48, Figs. 4 and 6, is similar to the rate changer disclosed in a copending application Serial No. 52,095, filed November 29, 1935, and will therefore here be only briefly described. The rate changer includes a driving gear 91 fixed on the sleeve 47, a driven gear 92 fixed on another sleeve 93 which is rotatably mounted on sleeve 47, and gears such as 94 fixed on shafts 95, preferably three, equiangularly spaced and each simultaneously engaging the driving gear 91 and driven gear 92. The shafts 95 are each journaled in a cage generally denoted by the numeral 96, which is supported for independent rotation coaxial with sleeve 47, the cage including a sleeve portion 96a and flange portions 96b and 96c fixed with sleeve 96a and respectively carrying the bearings for the opposite ends of shafts 95, the bearings in this instance being anti-friction bearings such as 97, 98.

Fixed for rotation or integral with each of shafts 95, Fig. 6, are conically tapered friction rolls such as 99, the axis of the shafts 95 being angularly disposed with respect to the axis of drive sleeve 47, at such angle that the outer periphery of each of the conical rolls stands parallel with the axis of the drive sleeve. Frictionally simultaneously engaging the peripheries of each of the rolls 99 there is a non-rotatable friction ring 100 carried by a frame generally denoted by the numeral 101, the frame together with the ring 100 being adjustable in a path parallel with the axis of the drive sleeve 47, whereby to engage ring 100 with the outer periphery of rolls 99 at various points of different roll diameter, the frame being slidably guided for such movement on spaced guide rods 102, 103, Fig. 3, to be shifted by means later described. Ring 100 is prevented from rotation and is carried by frame 101 in a manner permitting of a certain amount of adjustment relative to the frame whereby to simultaneously engage the periphery of each of the friction rolls 99 with equal pressure and at corresponding roll diameters, but since the details of the ring mounting do not concern the present invention they will not here be described.

The friction contact between the rolls 99, Fig. 6, and ring 100 forces each roll and its companion gear 94 to revolve whenever cage 96 is revolved, and at a gear speed determined in part by the diameter of rolls 99 at the point of ring contact. As the ring 100 is axially shifted it contacts rolls 99 at points of differing roll diameter and changes the relative speed of the gears. Thus as the ring is adjusted to engage the smaller diameter of the rolls 99 the speed of the rolls and of the gears 94 increases, and vice versa, and the relationship of the various parts of the rate change device 48 is such that when sleeve 47 is driven at a constant speed the adjustment of ring 100 will enforce a variable speed on driven gear 92. With the parts proportioned as shown in Fig. 6 the speed of driven gear 92 may be any of a stepless series of speeds having a range from zero speed, obtained when ring 100 is engaging a small diameter of rolls 99, to a maximum speed which is somewhat less than the speed of drive shaft 46, depending on the ratio of the driving and driven gears 91, 92, the ratio of the smallest and largest diameters of rolls 99, etc.

For the adjustment of the output speed of the rate changer 48 the ring 100 is axially shifted by mechanism as follows: A shifter fork 126, Figs. 3, 4, and 6 engages the frame 101 and is guided on a rotatable cam shaft 127 and a rod 128. Shaft 127 is provided with a cam groove 127a which is engaged by a pivoted follower member 129 carried by the fork 126, the cam shaft being rotatable from a hand wheel 130 fixed on a shaft 131 and connected with the cam shaft by bevel gears 132, 133. A graduated feed dial 134 is rotatably carried on shaft 131 and readable against an indicator 135, the dial preferably being graduated for somewhat less than one revolution thereof to correspond with the range of speeds available from the rate changer 48, which ordinarily requires several revolutions of cam shaft 127 to effect. Reduction gearing is therefore provided between shaft 131 and dial 134, including a pinion 131a, an internal gear 134a, and an idler 136. The cam groove 127a may be of varying angle, as shown, whereby to effect a preferred spacing of the graduations of dial 134 such, for example, as to provide numbered graduations at equal spacing on the dial but corresponding to the terms of a geometrical progression.

The torque measuring device 49 includes relatively rotatable piston and cylinder members 49a, 49b, Figs. 4, 7, 8 and 11 respectively fixed with the driven sleeve 93 of the rate changer 48 and with the feed train gear 50. Fluid is supplied to the cylinder 49b, Fig. 7, from a positive acting pump 105, of any suitable form, driven from the continuously running quick traverse train sleeve 37, as by gears 106, 107, the fluid being carried from the output port 105a of the pump through closed channel means, as by a channel 108, a stationary coupling member 109, Fig. 4, a rotary coupling member 110, an annular groove 110a, and drilled channels 111, 112, in a manner to continuously urge relative rotation of piston and cylinder members 49a, 49b in the direction opposite to that urged by the transmission load carried by the gear 50. Except as it finds outlet through an overload relief valve 198, Fig. 7, fluid from pump 105 can escape only after the fluid pressure on piston member 49a has rotated the piston member against the resistance of the transmission load sufficiently for exposure of a drain channel 113, the fluid pressure in channel 108 therefore normally being proportional to the torque load on gear 50. To provide a predetermined minimum fluid pressure in the channel 108, the piston member 49a of the torque measuring device 49 is continuously urged, in a direction to cover the outlet port 113, by the means of a plunger 49c, the desired minimum fluid pressure being determined by the pressure of a plunger spring 49d, which is adjustable by the means of a spring abutment screw 49e. In addition to other uses, later explained, the device 49 operates as a hydraulic cushioning and shock absorbing device in the mechanical table train.

Figure 7:
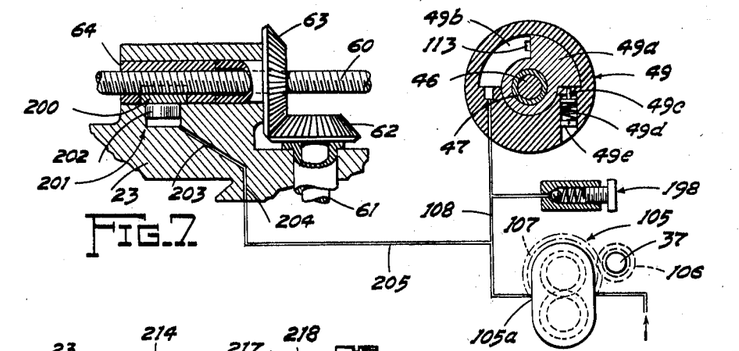
Figure 7 is a diagram showing the construction and operating relationship of certain torque responsive mechanism and backlash eliminating means, as incorporated in the machine of Fig. 1.

During the feed rate operation of table 22, and particularly during operations generally known as climb cutting, it is very desirable that there should be no lost motion between the table screw 60 and nut 64 such as might result in chatter or vibration or permit the cutter to suddenly pull itself into the work at a rate faster than the selected feed rate. To eliminate such lost motion and automatically establish a force opposing axial lost motion between the screw 60 and nut 64 there is provided the following structure: Screw 60, Figs. 3, 7, is constructed with threads having side faces at such angle that axial pressure has relatively little tendency to initiate or resist lateral movement of the screw. A portion of the nut is cut away at one side of the nut axis, as at 64b, Fig. 3, and in the space thus provided there is a member 200 which may be acted upon by a piston device generally denoted by the numeral 201 including a piston 202 operated by fluid pressure supplied through channels 203, 204, 205, Figs. 3, 7, from the channel 108, whereby the piston pressure varies in accordance with the feed torque load on the torque device 49 of the feed train except that a minimum value is established by the spring 49d, and a maximum value by an overload device 198. The operation of piston device 201 is to force the screw laterally to a pressure contact acting between both sides of each screw thread and the corresponding both sides of the nut threads, there being clearance at the top and bottom of the threads to permit such engagement, even after wear takes place. Where the screw and nut are properly fitted there is very little lateral movement required and the result is to eliminate all backlash or lost motion between the screw and the nut. Moreover, the pressure connection is such that during table movements at quick traverse rate, and during manual table movement from the squared screw end 60a, there is a minimum of lateral pressure, the pressure then being reduced to that established by the spring 49d.

Figure 9:
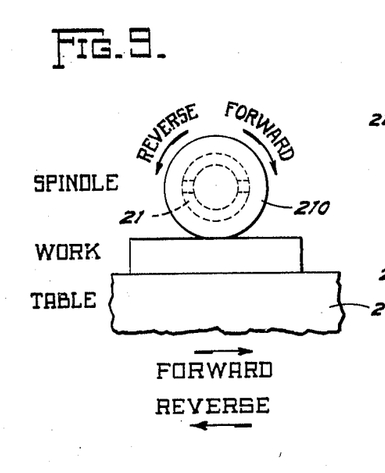
Figure 9 is a diagram illustrating possible direction relationship of the spindle and table of the machine.

The climb cutting conditions, such as mentioned, occur when the work-contacting side of a cutter such as 210, Fig. 9, is moving in the same direction as the table 22. The cutter periphery moves much faster than the table, and under climb-cutting conditions the cutting pressure is negative, that is to say the cutter urges the table ahead of its transmission whereby the torque is negative as compared with conditions where the cutter opposes table movement. If the table screw such as 60 is of so-called quick pitch, that is to say with relatively high thread angle whereby it is not self-locking, such negative cutting pressure and torque may cause overrun with resulting chatter or damage even where there is no axial lost motion between the screw and nut, the negative cutting pressure operating on the screw to cause screw rotation and negative torque on the drive train, resulting in table movement ahead of the transmission to the extent of any rotational lost motion existing in the table driving train.

Rotational overrun caused by negative cutting pressure and negative torque may be prevented either by setting up a back pressure or resistance sufficient to balance the negative cutting pressure, whereby to continuously effect positive torque on the table drive train, or by increasing the friction pressure between the screw and nut threads sufficiently to make the quick pitch screw self-locking in its action, whereby to prevent overrun and negative torque irrespective of the negative cutting pressure.

There will first be described means for preventing negative torque by means opposing negative cutting pressure.

Figures 8, 8A, 8B:
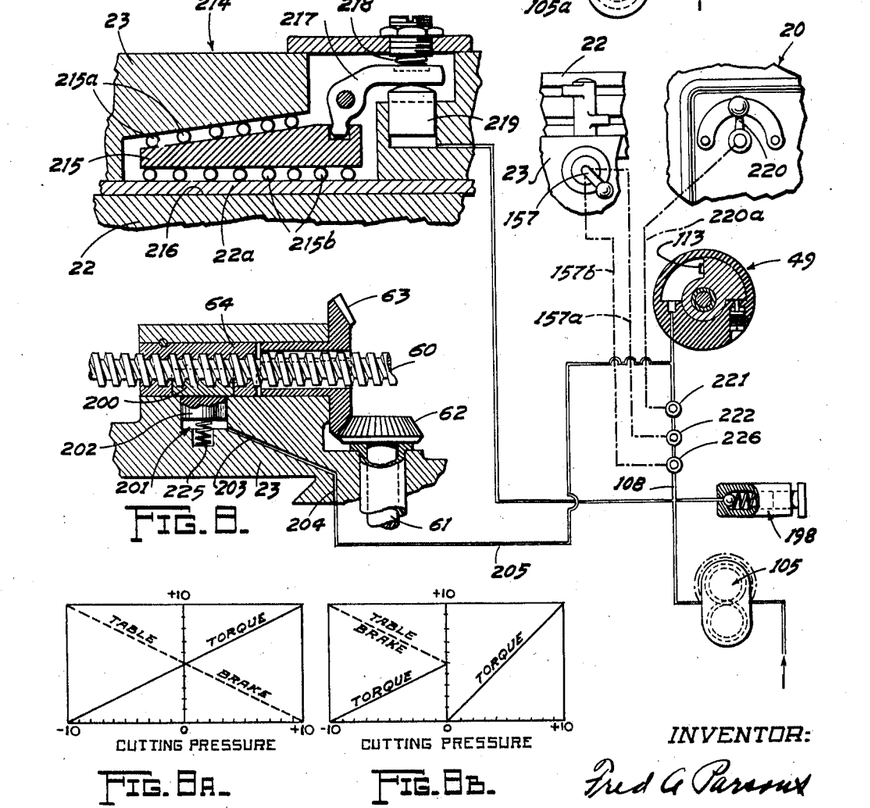
Figure 8 is a diagram showing the operating relationship of the torque responsive mechanism and backlash eliminating device of Fig. 7 with certain modifications and additions.
Figures 8A, 8B are force charts showing characteristics during certain modes of operation of the machine.

In the device of Fig. 8 the piston 202 receives pressure fluid from the pump 105 and torque measuring device 49, whereby to eliminate axial backlash between the screw 60 and nut 64 substantially as previously described. In addition there is torque controlled brake means, generally denoted as 214, for opposing negative cutting pressure to continuously maintain a positive torque on the driving train of screw 60, as follows:

An endwise movable wedge member 215 is arranged in a recess in saddle 23, the saddle forming a wedge abutment in the one lateral direction through anti-friction rolls such as 215a. In the other lateral direction the wedge thrusts against an angular lateral guide surface 216 of table 22, preferably through an adjustable table gib 22a of conventional type and anti-friction rolls such as 215b. The wedge 215 is continuously urged in wedging direction, whereby to increase the friction resistance to table movement in its slideways, by the means of a pivoted lever 217 and an adjustable spring 218. The spring pressure is opposed by a piston device 219 deriving fluid pressure from pump 105.

One or more of the brake devices such as 214 may be used, sufficient to effect table resistance, when the springs such as 218 are not opposed, to prevent forward table movement under the conditions of maximum negative cutting pressure. The piston devices such as 219 are so proportioned that the torque controlled fluid pressure will reduce the table friction set up by the wedges such as 215 substantially to zero at the point where positive cutting pressure, during normal cutting, is substantially of the same value as the maximum negative cutting pressure just mentioned. Under such conditions the load on the table transmission will always be positive and will vary in a characteristic manner charted in Fig. 8A. The increase in the positive torque through torque measuring device 49 operates to increasingly oppose the spring 218 and reduce the wedge pressure, but sufficient resistance to table movement will be maintained to prevent overrun under any cutting conditions.

The mode of operation characterized by the chart Fig. 8A is somewhat wasteful of power, since considerable frictional resistance is operating during positive cutting pressures, when it is not needed, particularly if the axial lost motion of the screw 60 is eliminated as stated. To avoid such lost power the brake friction may be controlled to be operative only when the cutting conditions effect negative cutting pressures.

Referring to Figs. 1, 9, the spindle 21 may be operated either in the forward or reverse directions indicated in Fig. 9, according to the positioning of the spindle reverser lever 220, Figs. 1, 8. The table 22 may be operated in either the forward or reverse directions indicated according to the positioning of the lever 157, Figs. 2, 8. As has been stated, the cutter 210 can only operate to urge the table ahead of its transmission, whereby to effect negative cutting pressure, when the periphery of the cutter at the point where it engages the work is moving in the same direction as the table. Such negative cutting pressure condition will occur only during the combinations, Fig. 9, of spindle forward, table reverse and of spindle reverse, table forward. During the spindle forward, table forward and during spindle reverse, table reverse combinations the cutting pressure will be positive.

Figure 10:
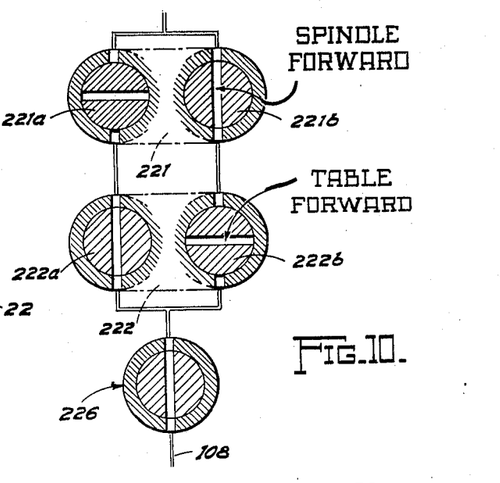
Figure 10 is a section of certain valves shown in Fig. 8.

The control levers 220 and 157, just mentioned are respectively connected for operation of control valves 221, 222, Figs. 8, 10, serially arranged in the pressure line 108 between the pump 105 and torque measuring device 49, the valves being positioned beyond the point of take-off of the branch lines leading to piston 219 and to the overload device 198. The control connections may be of any suitable type and therefore are diagrammatically indicated, as at 220a, 157a. Each of the valves 221, 222 have valve passageways at different levels, such as the passageways 221a, 221b, Fig. 10, for the valve 221 controlled from spindle reverse lever 220, and passageways 222a, 222b for the valve 222 controlled from the table reverse lever 157. The connections 220a, 157a, Fig. 8, are such that in each instance the movement of the associated reverser lever during reversal rotates the connected valve 90 degrees, and the valves are provided with ports and passageways, as shown in Fig. 10, such that in the spindle forward, Fig. 9, position of the spindle reverse lever 220, and the table forward, Fig. 9, position of the table reverse lever 157, the passage 108 is closed by the valves against flow of fluid to the torque measuring device 49. Under such condition the maximum pressure of pump 105, as determined by the relief valve 198, will operate on the piston 219 and the spring 218 will be completely overcome, whereby to entirely relieve the table 22 of any friction set up by the wedge device 215. The arrangement of the ports and passageways also blocks the channel 108, as will be apparent, Fig. 10, when the valves are each turned 90 degrees for the spindle reverse and table reverse combination, Fig. 9.

However, if only one of the valves 221, 222, Fig. 10, is turned 90 degrees from the position shown in Fig. 10, whereby to effect either the spindle forward, table reverse combination or the spindle reverse, table forward combination, Fig. 9, fluid will pass the valves to the torque measuring device 49, which then will control the piston 219 to regulate the table brake 214 as previously described.

Figures 11, 11A, 11B:
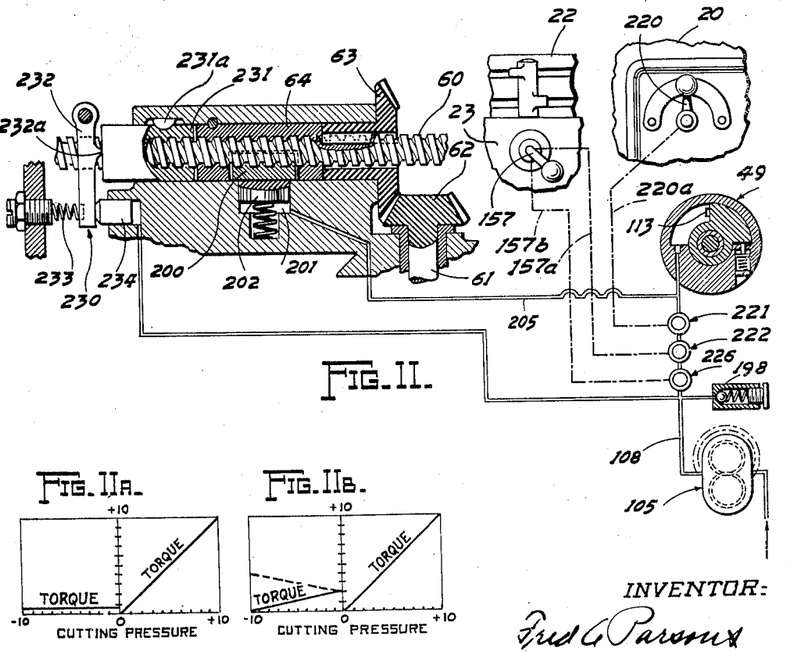
Figure 11 is a diagram showing the operating relationship of the torque responsive mechanism and backlash eliminating device of Fig. 7 with other modifications and additions.
Figures 11A, 11B are force charts indicating characteristics during other modes of operation of the machine.

The specific form of the connections 157a and 220a diagrammatically shown in Figs. 8, 11 will be determined by the nature of the control movements of the corresponding operation, which in this instance are the hand levers 157 and 220.

Thus, the said copending application Serial 330,051, of which this case is a division, is in turn a division and continuation of the copending application Serial No. 162,977 now resulted in Patent No. 2,204,693, issued June 18, 1940. Said copending antecedent applications disclose that the table reverser 54 is in this instance controlled by rotation of the hand lever 157 through a predetermined angle about a vertical axis. Any suitable mechanical or other connection 157a which will effect the required 90° rotation of the valve 222 in the proper directions during the rotation of lever 157 from table forward to reverse positons or vice versa will answer the purposes of the required control of valve 222.

Similarly, the spindle reverser lever 220 is, in this instance, rotatable through a predetermined angle about the horizontal axis of its supporting shaft for effecting forward or reverse spindle rotation, as by the adjustment of a suitable spindle reverser clutch such, for example, as is shown in the Patent No. 2,203,743, issued June 11, 1940. Any suitable mechanical or other connection 220a which will effect the 90° rotation of valve 221 in the proper directions during the rotation of lever 220 from forward to reverse spindle drive positions and vice versa will answer the purposes of the required control of valve 221.

With the valves 221, 222 controlled as described, there will be no back pressure set up by the wedge device 215 during positive cutting pressure, and the characteristic chart for cutting pressure and torque will then be as shown in Fig. 8A. This provides table back pressure sufficient to maintain a positive torque preventing overrun during any negative cutting pressure conditons, but without material back pressure which would cause waste of power during positive cutting pressure conditions.

The torque controlled backlash eliminating device of Fig. 8, operated from piston 202, Figs. 3, 7, 8, operates to avoid possibility of axial lost motion. However, as shown in Fig. 8, the piston 202 is connected to receive pressure fluid only through valves 221, 222, whereby the fluid pressure on piston 202 is operative only during negative cutting pressure conditions. A preferred constant pressure may be applied to be operable at other times as, for example, by a spring 225, Fig. 8.

It will be noted that the valve 222, Figs. 8, 10, operates to close the channel 108, whereby to release the brake pressure opposing table movement, as described, whenever the table reverser lever is in central position, as will be apparent in Fig. 10. This is the position of the lever whenever the table is to be manually operated as, for example, by a hand crank (not shown) applied to the squared end 60a of table screw 60, and table manual movement will therefore not be opposed by brake 214. It is also preferable that the brake 214 should not be operative during rapid traverse movements of the table, irrespective of whether such movement takes place during negative or positive cutting pressure combinations of the spindle and table reverser positions. The vertical movements of hand lever 157 alternatively effect quick traverse or feed rates, as has been stated, and to close the channel 108, Fig. 8, whereby to eliminate the brake during quick traverse rate movements, there is provided a valve 226, Figs. 8, 10, connected for operation from lever 157 as by connecting means 157b, to shift the valve to the open position shown in Fig. 10 in the feed rate position of lever 157, and to rotate the valve to closed position when lever 157 is positioned for quick traverse rate.

Similarly to the control of valves 221, 222 from the levers 157 and 220, any suitable connection 157b may be used for the control of valve 226 from lever 157. In the present instance the lever 157 effects alternative feed or quick traverse table movements by movements about a horizontal axis for the shifting of the clutch 39, as is fully explained in said antecedent application Serial No. 162,977 now resulted in Patent No. 2,204,693, issued June 18, 1940. Any suitable mechanical or other connection 157b may be used which will shift the valve 226 from open to closed position or vice versa, as described, in accordance with the movements of lever 157 to feed or to quick traverse position about its horizontal axis.

There will next be described a device for preventing negative torque by means increasing the friction between the screw and nut threads sufficiently to make quick pitch screws self-locking in operation, as previously mentioned.

In the device of Fig. 11 the screw 60 is provided with torque controlled backlash eliminating means cooperative with the fixed nut 64 and including a piston device 201, similarly to the device of Fig. 8. In addition there is provided torque controlled screw-nut pressure means generally denoted by the numeral 230.

The pressure means 230, Fig. 11, includes an axially slidable nut 231 which is prevented from rotation by a key such as 231a. A pivoted lever 232 provides spaced fork portions for passage of screw 60 therebetween, and nut abutment portions thereon such as 232a, the lever being thrust in the one direction, to shift nut 231 to the right, by an adjustable spring 233, the spring pressure being opposable by a piston 234.

The threads of nuts 64 and 231 are respectively pressed against the opposite faces of the threads of screw 60 by the action of spring 233, the engaged surfaces acting as a brake resisting rotation of screw 60. At the relatively low rotational speds of screw 60 during feed rate motion of the table the braking effect varies substantially in accordance with the spring pressure. Spring 233 may be so proportioned that, when unopposed, the braking effect is sufficient to prevent the maximum available negative cutting pressure from causing rotational overrun of the screw, whereby to prevent overrun caused by rotational lost motion in the screw driving train. Since the screw will ordinarily be nearly self-locking without the brake, the brake pressure and power required to prevent screw rotation from negative cutting pressure is relatively small. With the described construction there will be some positive torque, due to the brake, operating on the table train at all times while the brake is effective, but piston 234 is controlled from the levers 157 and 220 by the means of valves 221, 222, 226 in the manner explained for the brake piston 219 of the device of Fig. 8, whereby to eliminate the brake action during positive cutting pressure conditions, during hand feed operations and during quick traverse rate movements. A characteristic cutting pressure and torque chart for this mode of operation of the device of Fig. 11 is shown in Fig. 11A.

The device of Fig. 11 may also be operated in such manner as to prevent overrun by a combination of the methods previously mentioned, that is to say in part by opposing the negative cutting pressure and in part by the screw-brake action effecting self-locking operation of the screw. For such mode of operation the spring 233 is proportioned for the unopposed spring to provide pressure materially in excess of that required for the mode of operation previously described, and the torque controlled piston device 234 is so proportioned as to substantially completely relieve the nut 231 from the spring pressure at the point where the positive cutting pressure is equal in numerical value to the maximum negative cutting pressure. In such case, and with the valves controlled from the levers 157, 220 as described, there will result a force diagram similar to that of Fig. 8B, but the combination of direct nut pressure and screw-brake effect will modify the force diagram somewhat as indicated in Fig. 11B.

The mode of operation of the device of Fig. 11 may be further modified for the spring 233, etc., to operate as a backlash eliminating device. For this result spring 233 is so proportioned that when unopposed it maintains the nut 231 to the limit of its possible right-hand movement, Fig. 11, that is to say with the screw 60 forced against the fixed nut 64, under conditions of maximum negative cutting pressure tending to force the screw to the left, Fig. 11, and the torque controlled piston 234 is so proportioned as to substantially completely relieve nut 231 from spring pressure at the point where the positive cutting pressure is equal in numerical value to the maximum negative cutting pressure. In such case the threads of screw 60 will be continuously maintained in pressure contact with the same side faces of the threads of nut 64 and any axial lost motion, as well as rotational overrun will be eliminated, whereby the piston device 202 will be unnecessary for the purpose. The characteristic force diagram will then be substantially as in Fig. 8B.

It will be noted that, as to the last described modifications of the mode of operation of the structure of Fig. 11, the device will operate as described only for one direction of negative cutting pressure, since the spring 233 and piston 234 operate in only one direction on nut 231. This single direction of operation does not apply to the mode of operation first described for Fig. 11, and if the two-way action is desired for the other modes, it may readily be had by use of two spring and piston devices such as 233, 234, respectively operative in different axial directions on nut 231, and controlled to be operable one at a time by suitable control connections operated from spindle reverser lever 220. Since the necessary structure for such control will be obvious, it is not shown.

What is claimed is:

1. In a machine tool having a table and a reversibly rotatable spindle, the combination of spindle transmission and control means including a shiftable reverser member, a table transmission including a torque responsive device, adjustable mechanism for controlling a force urging said table ahead of its transmission, an automatic adjusting connection for adjustment of said mechanism in accordance with the torque response of said device, and control means for said mechanism connected for operation at least in part in accordance with the position of said spindle reverser member.

2. In a machine tool having a reversibly operable table and a reversibly rotatable spindle, the combination of table transmission and control means including a shiftable table reverser member, spindle transmission and control means including a shiftable spindle reverser member, mechanism for controlling a force urging said table ahead of its transmission, and control means for said mechanism connected for operation in part in accordance with the position of said table reverser member and in part in accordance with the position of said spindle reverser member.

3. In a machine tool having a reversibly operable table and a reversibly rotatable spindle, the combination of table transmission and control means including a torque responsive device and a shiftable table reverser member, spindle transmission and control means including a shiftable spindle reverser member, adjustable mechanism for controlling a force urging said table ahead of its transmission, an automatic adjusting connection for adjusting said mechanism in accordance with the torque response of said device, and control means for said mechanism connected for operation in part in accordance with the position of said spindle reverser member and in part in accordance with the position of said table reverser member.

4. In a machine tool having a reversibly operable table, the combination of a table transmission and control means including a torque responsive device and a shiftable table reverser member, adjustable mechanism for controlling a force urging said table ahead of its transmission, an automatic adjusting connection for adjusting said mechanism in accordance with the torque response of said device, and control means for said mechanism connected for operation at least in part in accordance with the position of said table reverser member.

5. In a machine tool having a reversibly operable table, the combination of table transmission and control means including a torque responsive device and a member shiftable for alternative feed or quick traverse rates and a shiftable reverser member, adjustable mechanism for controlling a force urging said table ahead of its transmission, an automatic adjusting connection for adjusting said mechanism in accordance wtih the torque response of said device, and control means for said mechanism connected for operation in part in accordance with the position of said feed or quick traverse member and in part in accordance with the position of said table reverser member.

6. In a machine tool having a reversibly operable table and a reversibly rotatable spindle, the combination of spindle transmission and control means including a shiftable reverser member, a table transmission and control means including a torque responsive device and a member shiftable for alternative feed or quick traverse rates and a shiftable table reverser member, adjustable mechanism for controlling a force urging said table ahead of its transmission, an automatic adjusting connection for adjusting said mechanism in accordance with the torque response of said device, and control means for said mechanism connected for operation in part in accordance with the position of said spindle reverser member and in part in accordance with the operation of said table reverser member and in part in accordance with said shiftable feed or quick traverse member.

7. In a machine tool having a table, the combination of a table train including a torque responsive device, brake means opposing said train including a pressure means urging said brake means in braking direction, adjustable mechanism for opposing said pressure means, and an automatic adjusting connection for adjusting said mechanism in accordance with the torque response of said device.

8. A machine tool comprising a base, an operating member movably mounted on said base, a rotary power operated driving train selectively connectible to actuate said operating member, a variable resistance device disposed to oppose movement of said operating member in manner to prevent overrunning thereof, and means responsive to torque exerted by said rotary driving train to vary the opposition of said resistance device, whereby the resistance to movement of said operating member may be adjusted inversely to the driving torque.

9. In a power transmission mechanism for driving a movable element of a machine tool, a rotary power driven member operatively connected to effect movement of said machine tool element, resistance means operatively connected to oppose movement of said element for preventing overtravel thereof relative to said power driven member, and means responsive to torque exerted by said power driven member to regulate said resistance means, whereby the resistance exerted in opposition to movement of said element may be adjusted in accordance with the driving torque exerted to effect movement of said element.

10. In a machine tool, a supporting frame, a member movably mounted on said frame, power operated rotary driving means selectively operable to move said member, adjustable movement resisting means selectively operable to oppose movement of said member in manner to prevent overrunning thereof, torque responsive means associated with said driving means in manner to function in response to torque being transmitted thereby, and control means operating in response to said torque responsive means and functioning to adjust said movement resisting means, whereby said resisting means may be adjusted in manner to reduce the resistance in accordance with increase in the driving torque.

FRED A. PARSONS.